United States Patent [19]

Hehl

[11] 4,021,181
[45] May 3, 1977

[54] TIE ROD CONNECTION FOR DIE CLOSING UNIT OF INJECTION MOLDING MACHINE

[76] Inventor: Karl Hehl, Arthur-Hehl-Strasse 32, 7291 Lossburg, Germany

[22] Filed: May 25, 1976

[21] Appl. No.: 689,813

Related U.S. Application Data

[63] Continuation of Ser. No. 569,886, April 21, 1975, abandoned.

[30] Foreign Application Priority Data

Apr. 23, 1974   Germany .......................... 2419426

[52] U.S. Cl. .......................... 425/450.1; 425/451.2; 425/DIG. 223; 425/242 R
[51] Int. Cl.² .......................... B29F 1/06; B30B 1/00
[58] Field of Search ............. 425/242 R, DIG. 222, 425/DIG. 223, 450.1, 451.2, 451.6

[56] References Cited

UNITED STATES PATENTS

| | | | |
|---|---|---|---|
| 3,093,863 | 6/1963 | Ehlert | 425/451.2 |
| 3,465,387 | 9/1969 | Allard et al. | 425/DIG. 223 |
| 3,528,134 | 9/1970 | Fischback | 425/242 R X |
| 3,577,596 | 4/1971 | Bullard | 425/242 R X |
| 3,597,798 | 10/1971 | McDonald | 425/DIG. 223 X |
| 3,606,641 | 9/1971 | Carrieri et al. | 425/242 X |
| 3,729,283 | 4/1973 | Eggenberger et al. | 425/242 R X |
| 3,756,757 | 9/1973 | Grundmann | 425/242 R X |
| 3,905,741 | 9/1975 | Poncet | 425/242 R X |

FOREIGN PATENTS OR APPLICATIONS 1,090,094   9/1960   Germany .......................... 425/450.1

Primary Examiner—J. Howard Flint, Jr.
Attorney, Agent, or Firm—Joseph A. Geiger

[57] ABSTRACT

A tie rod connection for the die closing unit of an injection molding machine in which the tie rods, extending on either side of the injection molding die between die plates or other thrust members, are connected thereto with a connection that includes a split abutment ring received inside a groove of the tie rod located outside the thrust member and a clamping cap retaining the abutment ring while preloading the connection between the tie rod and the thrust member.

5 Claims, 3 Drawing Figures

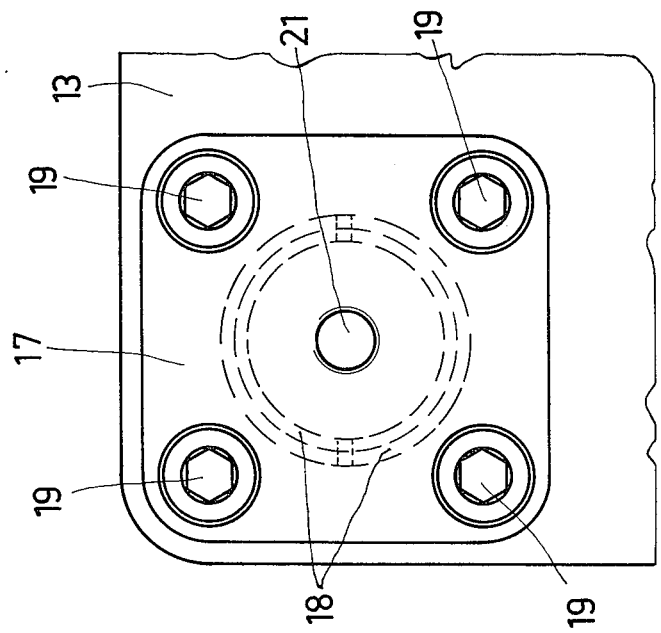
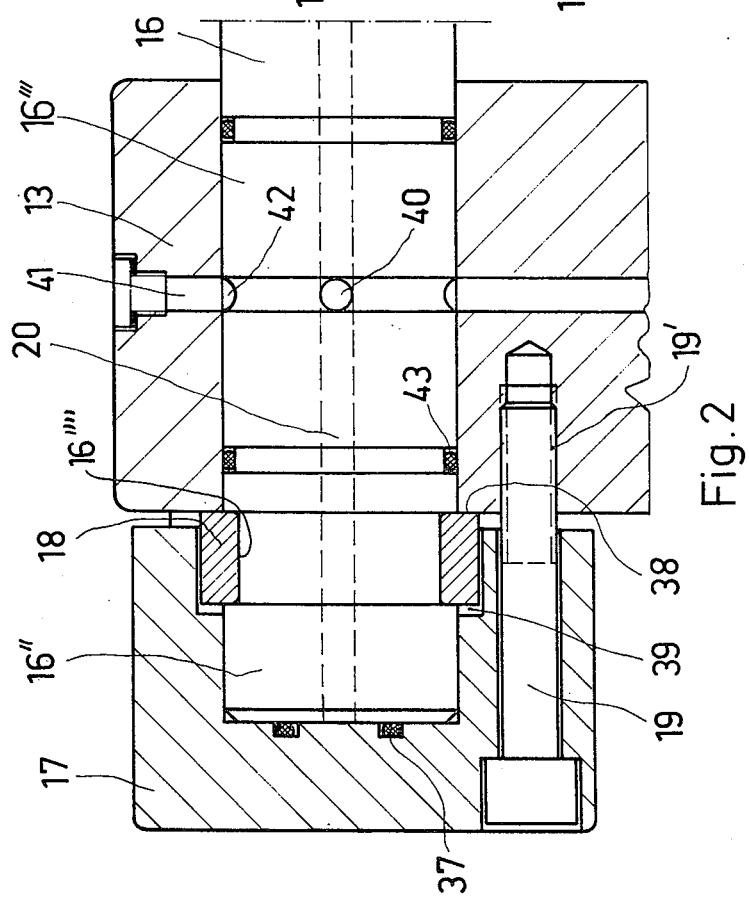
Fig.3
Fig.2

TIE ROD CONNECTION FOR DIE CLOSING UNIT OF INJECTION MOLDING MACHINE

CROSS REFERENCE TO RELATED APPLICATIONS

This application is a continuation of my co-pending application Ser. No. 569,886, filed on Apr. 21, 1975, now abandoned.

BACKGROUND OF THE INVENTION

1. Field of the Invention

The present invention relates to injection molding machines and, more particularly, to hydraulically actuated die closing units of injection molding machines in which the movable parts of the die closing unit are supported and guided by means of two or four tie rods.

2. Description of the Prior Art

Die closing units may be of the knee linkage type, where the hydraulic cylinder is oriented transversely to the opening and closing movement of the two halves of the injection molding die, or they may be of the multi-cylinder type, in which the movable parts of the die closing unit are directly attached to the piston rods of the hydraulic cylinders. In both cases, the movable assembly is supported and guided on tie rods. In the case of a multi-cylinder die closing unit, the tie rods also serve as the piston rods.

In the past, it has been common practice to connect the tie rods to the stationary and/or movable parts of the die closing unit by providing on the tie rods a reduced-diameter threaded end portion, with a ring shoulder at the inner end of the reduced-diameter portion. One such prior art configuration is disclosed, for example, in the German Offenlegungsschrift (Publ. Appln.) No. 1,629,707. There, the tie rods are stationary rods, connected on one extremity to a stationary die plate, while their opposite ends are similarly connected to a stationary thrust stock. Between these supports is arranged a knee-linkage-type hydraulic die closing mechanism. Each tie rod is thus axially clamped to a cooperating part, through the action of a nut engaging the thread of the reduced-diameter end portion of the tie rod. This connection must withstand the closing pressure exerted by the die closing unit against the two halves of the molding die, a pressure that might be as high as 60 tons, for certain injection molding machines. In view of the fact that this closing pressure on the die tends to axially separate the tie rod from its cooperating part, it has been found to be necessary for the clamping force between the ring shoulder of the tie rod and the face of the cooperating part to be at least equal to the closing pressure, in order to avoid a separation of these parts at the ring shoulder. Obviously, if such a separation takes place at the shoulder, the stability of the connection is greatly diminished and wear will take place at the surfaces of relative displacement between the parts. Considering the limitations to the diameter range of tie rods used for injection molding machines of the above-described type, it has been found that the prior art tie rod connection could not always guarantee uninterrupted maintenance of such an abutment contact, especially in cases where, in the closed position of the injection molding die, unequal pressures are generated in the main pressure cylinders of the die closing unit. Such unequal pressures may be the result of an asymmetry in the hydraulic controls of the die closing unit. If, as a result of such an uneven pressure distribution, the abutment faces of the tie rod shoulder and of the cooperating part become separated under the closing pressure, such separation will reflect itself in a deflection and misalignment of the part to which the tie rods are connected. This condition, repeating itself during every injection cycle of the machine as a rythmic application of stress and deflection, may lead to fatigue phenomena of the material in the critical zones of the tie rods, with eventual fatigue failure in these zones. It should be noted that, due to the diameter step at the tie rod shoulder, the bending and fatigue stress is concentrated around the immediate area of the annular shoulder.

SUMMARY OF THE INVENTION

Underlying the present invention is the primary objective of providing an improved die closing unit of the earlier-mentioned type in which the tie rods may be stressed asymmetrically with regard to the center axis of the die closing unit, and where the tie rods are more resistant to bending stress and fatigue, to the extent that the latter is unavoidable, without an increase in the diameter of the tie rods. Another objective of the present invention is to simplify the manufacture of these tie rods.

These objectives are attained with the present invention, which suggests a novel tie rod connection for the die closing unit of an injection molding machine in which the tie rods reach through and are seated in the attached part with their full diameter, the axial abutment for the transmittal of the closing pressure being obtained by means of an enlarged-diameter shoulder on the tie rod beyond the attached part, this shoulder being an end face of a split abutment ring accommodated in a shallow groove of the tie rod. At the same time, the tie rod and the attached part are axially clamped against each other, against the same abutment, so that the closing pressure during operation of the die closing unit does not oppose itself to the clamping abutment, as is the case with the previously described prior art connection.

The proposed configuration further greatly simplifies the manufacture of the tie rods, by eliminating the reduced-diameter seating portion on the tie rods. Now, the outer diameter of the tie rods can be obtained through precision turning, followed by a surface compacting treatment in a rolling operation. These manufacturing steps can be performed in continuous operations, in a more efficient standardized production procedure. In contrast thereto, the prior art tie rods did require a grinding operation on the reduced-diameter rod portions. Also, a previously necessary relief groove for a reduction of the stress concentration on the rod shoulder is now no longer necessary.

The preloaded clamping engagement between the tie rod and the attached part is preferably obtained by means of a plurality of clamping bolts engaging a cap which encloses the extremity of the tie rod, abutting against its end face, while also retaining the split abutment ring inside its receiving groove, without pressing against that ring.

The proposed novel tie rod connection also makes it possible to conveniently run the necessary hydraulic channel through this connection, either axially through the clamping cap, or radially into the seated portion of the tie rod. Because this seated portion is of the same diameter as the tie rod itself, the grooves for the necessary O-rings and channel connections now become much less critical, as regards their influence on the tie rod stress.

BRIEF DESCRIPTION OF THE DRAWINGS

Further special features and advantages of the invention will become apparent from the description following below, when taken together with the accompanying drawing which illustrates, by way of example, a preferred embodiment of the invention, represented in the various figures as follows:

FIG. 2 shows the tie rod connection of FIG. 1, slightly modified, and at a greatly enlarged scale; and FIG. 3 is an end view of the tie rod connection of FIG. 1, at the scale of FIG. 2.

DESCRIPTION OF THE PREFERRED EMBODIMENT

Figure 1:
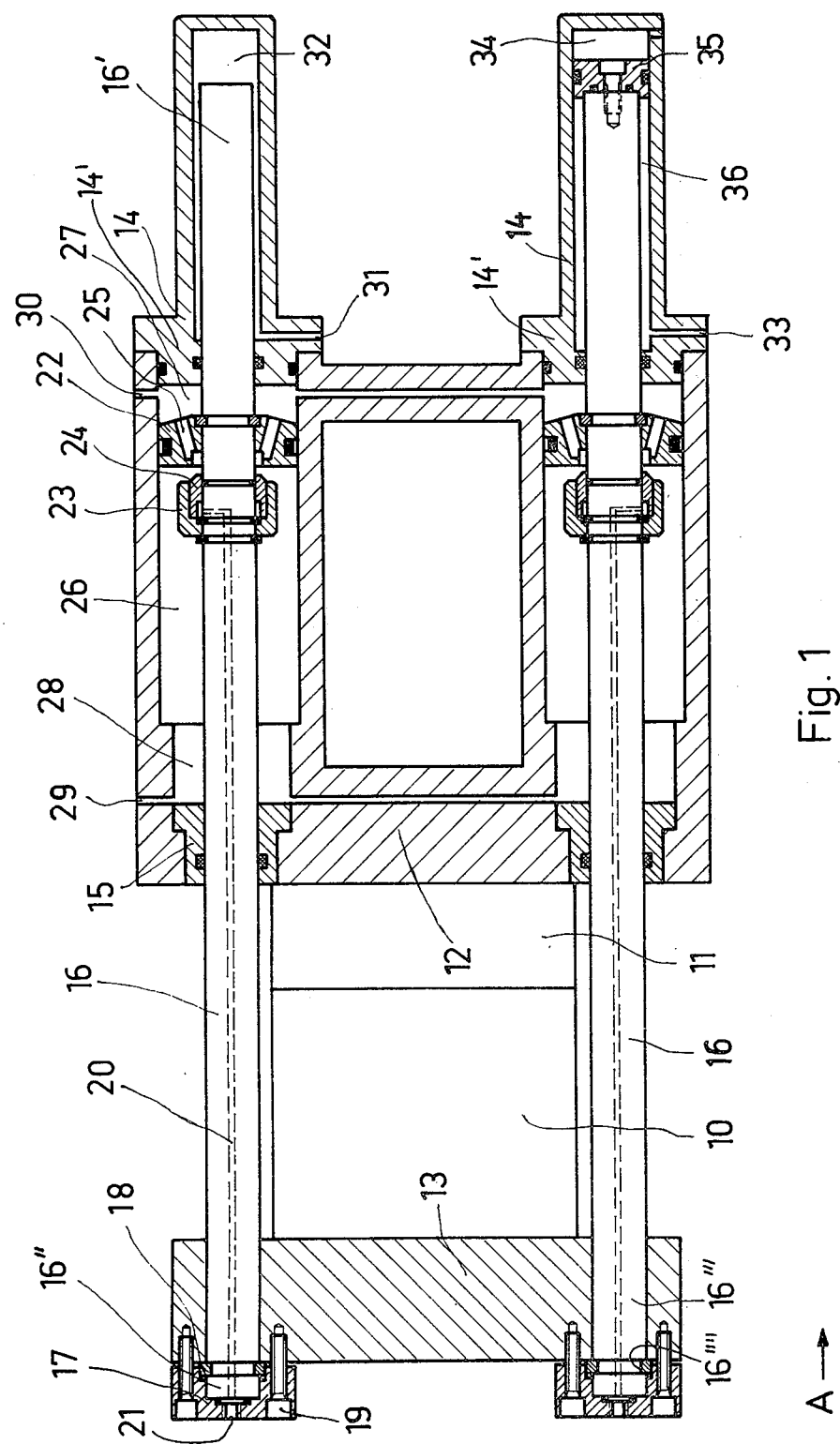
FIG. 1 shows a longitudinally sectioned die closing unit with a tie rod connection embodying the present invention.

Referring to FIG. 1 of the drawing, it can be seen that the die closing unit shown has two parallel tie rods 16 extending longitudinally through the unit. While two such tie rods are sufficient for small and medium-sized die closing units, larger units may require four such tie rods, arranged spatially on the four corners of a square or of a rectangle.

A die closing unit of this kind is normally mounted on top of a machine base (not shown), in either a vertical or a horizontal orientation. The central body of the die closing unit, by which it would be attached to the machine base, is a cylinder mount 12 whose forward portion also serves as a die plate for the stationary die half 11, and whose center portion accommodates hydraulic cylinder bores 26 and 28. Inside these bores are arranged two identical main pistons 22 which are being pressurized when the die is in its closed position, and which then provide the necessary die closing pressure. On the rear side of the cylinder mount 12 are further mounted two smaller cylinders, coaxially aligned with the axes of the tie rods 16 and main cylinder bores 26. These auxiliary cylinders 14 provide the rapid opening and closing motions for the die closing unit, the effective pressure areas in these cylinders being only a fraction of that of the main cylinders.

As the drawing shows, the tie rods 16 are also the piston rods for both the main cylinders 26 and the auxiliary cylinders 14. They are guided for longitudinal motion inside appropriate guide bushings 15 on the front end of the cylinder mount 12 and inside the connecting flange 14' of the auxiliary cylinders 14. The tie rods or piston rods 16 extend forwardly from their guide bushings 15, past the two die halves 10 and 11, of which the latter is stationary while the former is movable together with the movable die plate 13, by virtue of a rigid connection between the movable die plate 13 and the forward ends of the tie rods 16. The rigid assembly consisting of the tie rods 16, the movable die plate 13, and the movable die half 10, is thus displaceable toward and away from the cylinder mount 12 and its attached stationary die half 10, by pressurizing one or the other of the two auxiliary cylinders 14. As can readily be ascertained from FIG. 1, a pressurization of the pressure space 32 inside the upper auxiliary cylinder 14 causes the piston rod portion 16' to act as a piston of an effective diameter equal to the diameter of the rear portion 16' of the tie rod 16. During this opening stroke, the two main pistons 22 will execute the same forward movement, but without displacing the oil out of the main cylinder spaces 26 and 27, respectively. For this purpose, the main pistons 22 have each a series of axial bypass channels 25, permitting the pistons to move through the oil inside their cylinder bores, as long as the associated valve plungers 24 remain retracted inside their valve cylinder 23, as shown in the drawing. This valve action is controllable hydraulically via the axial channels 20 extending along the axes of the tie rods 16. A similar situation obtains when the die closing unit executes its closing motion, under the action of the lower auxiliary cylinder 14. There, an annular pressure space 36, defined between the rear portion 16' of the piston rod and a piston 35 attached to the extremity of the piston rod, is pressurized, in order to execute the closing motion. Again, the main pistons 22 simply move through the hydraulic fluid contained inside the main cylinders, the bypass channels 25 remaining open until the two die halves 10 and 11 are closed, or nearly closed. At that point, pressure is fed into the axial channels 20, so that the valve plungers 24 move toward the respective main pistons 22, closing their bypass channels 25. Now, the high pressure space 26 of both main cylinders is pressurized and the full force of this pressurization on the effective surface of the main pistons 22 is utilized to produce a closing pressure against the die halves.

As stated earlier, the movable die plate 13 is fixedly attached to the forward ends of the tie rods 16, the bores in the die plate 13 and the tie rods engaging each other with a tight fit. This tie rod portion 16''', as well as a tie rod end portion 16'' extending beyond the die plate 13, have the same outer diameter as the tie rod itself. Thus, with the exception of several shallow grooves, the tie rods 16 have one and the same diameter on their entire length.

A novel clamping configuration connects the tie rods 16 with the movable die plate 13. This connection consists essentially of a shallow groove 16'''' inside which is seated a split abutment ring 18. This ring has an abutment shoulder 38 engaging a forward face on the die plate 13, the tie rod 16 and the abutment ring 18 being clamped against the die plate by means of a cap 17 and a plurality of clamping bolts 19. The clamping cap 17, being centered on the rod end portion 16'', surrounds the split abutment ring 18 with a small clearance, having also appropriate axial clearances to the movable die plate 13 and the outwardly facing shoulder of the abutment ring 18 (see FIG. 2).

As a consequence of this configuration, it is no longer the case that the closing pressure generated by the two main pistons 22 is transmitted to the movable die plate 13 via the clamping element that holds the tie rod 16 against the die plate 13. In the prior art example referred to in the introduction to this disclosure, this clamping element is a nut which engages a threaded end portion of the tie rod. It is therefore also no longer necessary to preload this clamping connection to at least the level of the maximum closing pressure, the clamping bolts and clamping cap having to transmit only the force which is necessary to separate and open the die halves 10 and 11.

FIGS. 2 and 3 show two different possibilities of connecting the axial channel 20, through which the valve of the main piston is remotely controlled, to the outside and to appropriate centralized hydraulic controls. In FIG. 3, this connection is obtained simply by means of a central connecting bore 21 in the clamping cap 17, in alignment with the bore 20 of the tie rod 16. An O-ring 37 in the clamping face between the clamping cap 17 and the end face of the rod end portion 16" prevents any leakage. In FIG. 2 is shown an alternative outside connection for channel 20, where the latter first communicates with a transverse cross bore 40 in the received portion 16''' of the tie rod, the bore 40 in turn leading to a shallow annular groove 42, and hence a vertical transverse channel 41 connecting the groove 42 to the outside of the movable die plate 13. Two O-rings 43 on opposite sides of the annular groove 42 assure the leak tightness of the connection.

The novel axial connection between the tie rods 16 and the movable die plate 13 thus eliminates the previously problematic force reversals at the abutment faces of the connection, while at the same time considerably simplifying the manufacturing operations on the tie rods. In particular, it is now possible to eliminate the previously necessary grinding operations on the reduced-diameter portions of the tie rods, it being only necessary to precision turn the outer diameter of the tie rods and to subject this diameter to a rolling treatment in which the outer surface of the tie rods is smoothened and compacted. These operations are particularly time saving when a large number of identical tie rods, or tie rods of identical diameter, are to be manufactured.

The novel tie rod connection of the present invention has been described in connection with a particular die closing unit in which the tie rods also serve as piston rods for the main cylinders and auxiliary cylinders. The same connection is, of course, also advantageously applicable in other die closing units, as for example in the earlier-mentioned prior art knee-linkage die closing unit (German Offenlegungsschrift No. 1,629,707). There, both extremities of the tie rods are fixedly connected to stationary supporting members, one being the stationary die plate, the other a thrust stock. In the context of the appended claims, both the die plates — movable or stationary — and the aforementioned thrust stock should be seen as "thrust members".

It should be understood, of course, that the foregoing disclosure describes only a preferred embodiment of the invention and that it is intended to cover all changes and modifications of this example of the invention which fall within the scope of the appended claims.

The following is claimed:

1. In the die closing unit of an injection molding machine in which a movable die plate and a stationary die plate or equivalent thrust member are aligned relative to each other for opening and closing movement of the injection molding die along at least two parallel tie rods, and in which the closing pressure applied to the die via the die plates and/or thrust members is transmitted through the tie rods as a tension force, a tie rod connection rigidly attaching the tie rods to a die plate or thrust member, the tie rod connection comprising in combination:

a seating bore in the thrust member engaging the outer diameter of the tie rod with a tight fit, the tie rod reaching through said thrust member;

an abutment groove in a portion of the tie rod which protrudes beyond the thrust member, i.e. to the outer side thereof; said groove having a substantially planar face oriented toward said outer side of the thrust member;

a planar abutment face surrounding the tie rod bore on the outer side of the thrust member;

a split abutment ring with parallel axial end faces received inside said groove in such a way that one of the ring end faces bears against said planar groove face and the other ring end face, projecting radially beyond the abutment groove, bears against said abutment face of the thrust member, thereby creating a tension force on the tie rod, if an outwardly directed thrust acts on the thrust member;

means retaining the split abutment ring in the abutment groove;

a clamping cap engaging the protruding portion of the tie rod; and a plurality of axially oriented clamping bolts which are seated in the clamping cap and engage suitable threaded bores in the thrust member.

2. A tie rod connection as defined in claim 1, wherein the clamping cap also serves as said retaining means for the split abutment ring, having a bore enclosing the split abutment ring with a small radial clearance.

3. A tie rod connection as defined in claim 1, wherein:

the tie rod also has the same outer diameter on the protruding rod portion between the abutment groove and its extremity as on its received or seated length portion;

the clamping cap engages an end face on said tie rod extremity; and the clamping cap further has a bore engaging said diameter of the protruding rod portion with a tight fit.

4. A tie rod connection as defined in claim 3, wherein the tie rod further includes a hydraulic channel in the form of a central longitudinal bore extending from the protruding extremity of the tie rod a distance along said rod; and the clamping cap further includes a central threaded connecting bore in axial alignment with the hydraulic channel.

5. A tie rod connection as defined in claim 1, wherein the tie rod further includes a hydraulic channel in the form of a central longitudinal bore extending from the protruding extremity of the tie rod a distance along said rod, a peripheral groove in its seated length portion inside the thrust member, a transverse channel connecting its longitudinal bore with said groove; and the thrust member further includes a connecting channel with a threaded seat, said channel leading to the peripheral groove of the tie rod.

* * * * *